United States Patent [19]

Pees

[11] Patent Number: 4,921,226

[45] Date of Patent: May 1, 1990

[54] LINED AIR SLEEVE ASSEMBLY FOR AIR SPRING DAMPER

[75] Inventor: James M. Pees, Centerville, Ohio

[73] Assignee: General Motors Corporation, Detroit, Mich.

[21] Appl. No.: 329,047

[22] Filed: Mar. 27, 1989

[51] Int. Cl.$^5$ ............................................. F16F 9/32
[52] U.S. Cl. .............................. 267/64.24; 267/64.21
[58] Field of Search ............... 267/64.19, 64.21, 64.23, 267/64.24, 64.27

[56] References Cited

U.S. PATENT DOCUMENTS

| | | | |
|---|---|---|---|
| 3,078,086 | 2/1963 | Bank | 267/64.24 |
| 3,549,142 | 12/1970 | Tilton | 267/64.24 |
| 3,897,941 | 8/1975 | Hirtreiter et al. | 267/64.24 |
| 4,489,474 | 12/1984 | Brown et al. | 267/64.24 X |
| 4,763,883 | 8/1988 | Crabtree | 267/64.24 X |

Primary Examiner—Duane A. Reger
Attorney, Agent, or Firm—A. Michael Tucker

[57] ABSTRACT

An air sleeve assembly includes a tubular sleeve constructed from a radially elastomeric material. A liner constructed from a resilient material is positioned adjacent an inner surface of the tubular sleeve. A first fastener secures respective first ends of the sleeve and liner to a rigid tubular member of a damper. A second fastener secures respective second ends of the sleeve and the liner to a piston rod of the damper so that the sleeve and liner form a closed chamber for receiving pressurized fluid.

5 Claims, 1 Drawing Sheet

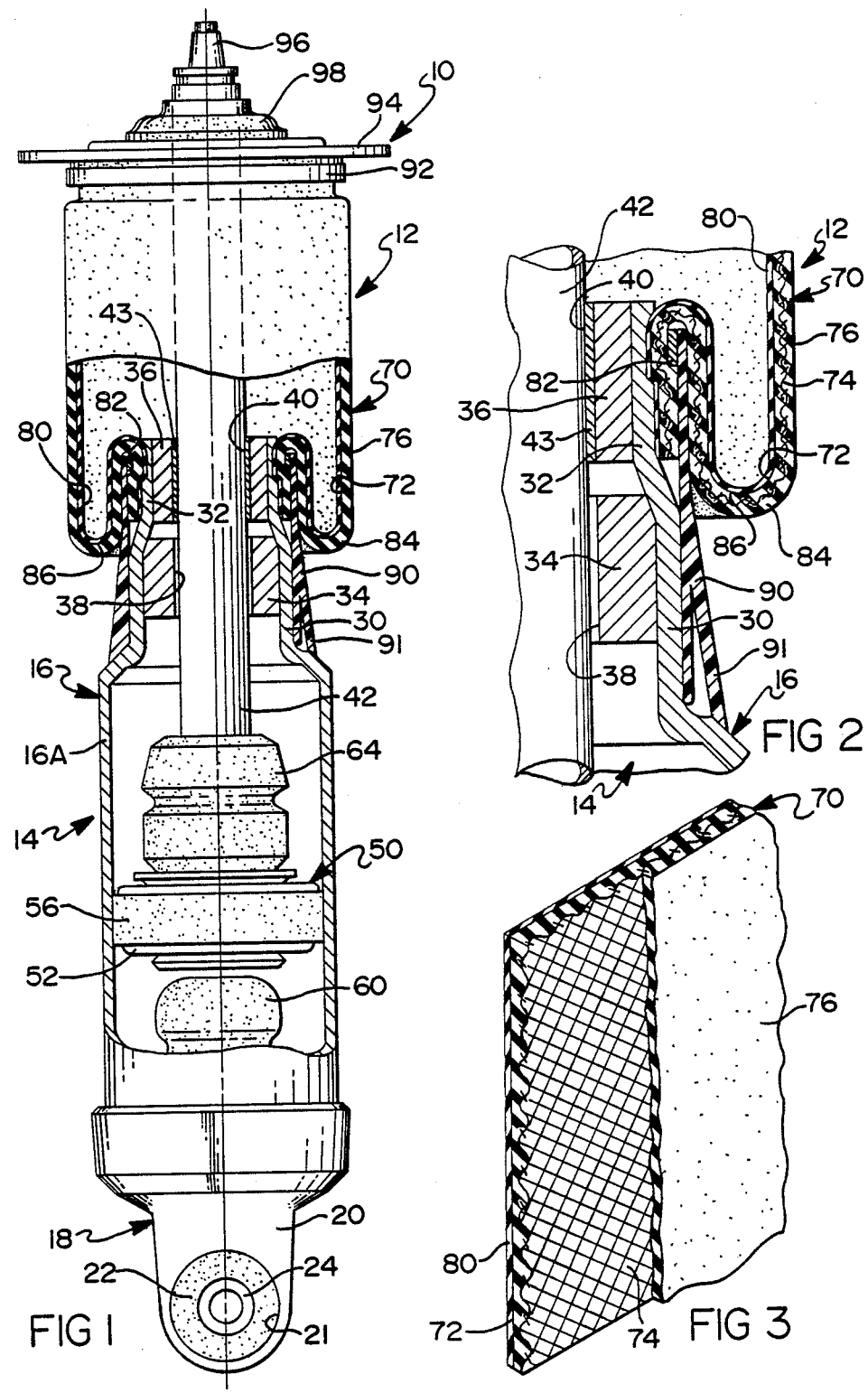

LINED AIR SLEEVE ASSEMBLY FOR AIR SPRING DAMPER

BACKGROUND OF THE INVENTION

1. Field of the Invention

The present invention relates generally to vehicle suspension, and in particular, is concerned with a lined air sleeve assembly for use with an air spring damper.

2. Statement of the Related Art

An air spring combined with a damper to provide a suspension device for a vehicle is well-known. Many conventional air springs employ an air sleeve constructed from a resilient material for forming a closed chamber to receive a pressurized fluid. Often times, the air sleeve includes a corded fabric or a nylon cord to strengthen the sleeve and retain the sleeve's shape. Depending upon the desired spring-characteristic, a selected volume of air or another fluid is introduced into the chamber. The air sleeve inflates to a selected shape and deforms during compression and rebound of the damper. Examples of an air sleeve combined with a damper can be found in the following U.S. Pat. Nos. 4,635,909, 4,688,774 and 4,763,883.

In order to reduce the stresses incurred by an air sleeve, an outer restraining sleeve can be combined with an air sleeve. Stresses are transferred from an air sleeve to a restraining sleeve, thereby increasing the working life of an air sleeve. An example of a restraining sleeve formed from a resilient material can be found in the applicant's pending U.S. patent application, Ser. No. 181,478 filed Aug. 14, 1988, which is assigned to the same assignee as the present invention. Examples of rigid and other resilient restraining sleeves can be found in U.S. Pat. Nos. 3,749,210, 4,722,516 and 4,741,517. A resilient restraining sleeve is disclosed in Italian Patent No. 632,278, issued in 1962.

Particularly after extended use or in high-pressure applications (such as 90 to 180 psi), air sleeves constructed from resilient materials tend to develop cracks and lose their effectiveness. High pressure and wear induce cracks in the sleeve's resilient material, e.g. rubber. A propagation of cracks eventually provides an escape route for air to travel from the high-pressure inner surface of an air sleeve through a corded fabric to the outer surface and the environment. Loss of fluid from the pressurized envelope reduces the effectiveness of the air spring.

The art continues to seek improvements. It is desirable that an air sleeve be capable of containing a pressurized fluid in high-pressure applications. Furthermore, it is desirable that an improved air sleeve fit within the physical constraints associated with a vehicle damper. It is also desirable that an improved air sleeve provide these desired characteristics at an economical cost.

SUMMARY OF THE INVENTION

The present invention includes a high-pressure air sleeve assembly for an air spring damper. A lined air sleeve provides an economical method of strengthening and extending the life of an air sleeve. In particular, the lined air sleeve provides a closed envelope capable of supporting air or other fluids in high-pressure applications.

In a preferred embodiment, the present invention includes an air sleeve assembly for use with an air spring damper. The air sleeve includes a tubular sleeve constructed from a radially elastomeric material. A liner constructed from a resilient material is positioned adjacent an inner surface of the tubular sleeve. A first fastener secures respective first ends of the sleeve and liner to a rigid tubular member of a damper. A second fastener secures respectivee second ends of the sleeve and the liner to a piston rod of the damper so that the sleeve and liner form a closed chamber for receiving pressurized fluid.

BRIEF DESCRIPTION OF THE DRAWINGS

FIG. 1 is a partially sectional view of an air spring damper employing a lined air spring assembly of the present invention.

FIG. 2 is a partial, enlarged sectional view of the present lined air sleeve assembly utilized in FIG. 1.

FIG. 3 is an enlarged perspective view of the present lined air sleeve assembly utilized in FIG. 1 with the outer surface broken away to reveal a corded fabric.

DETAILED DESCRIPTION OF THE PREFERRED EMBODIMENT

An air spring damper, indicated generally at 10, is illustrated in FIG. 1. Damper 10 includes an air spring 12 mounted on a damper assembly 14 to provide desired suspension of a vehicle.

Damper assembly 14 includes a rigid reservoir tube 16 formed from aluminum or other suitable material. Preferably, reservoir tube 16 is a one-piece cylindrical member having an upper portion with reduced diameter sections. A base cup 18 is welded or otherwise secured in an airtight manner to the lower end of reservoir tube 16. If desired, a conventional seal (not illustrated) can be placed between the outside diameter of the reservoir tube 16 and the inside diameter of the base cup 18.

The base cup 18 has a lower mount 20 with a transverse cylindrical opening 21 which receives elastomeric isolator 22 preloaded between the wall of opening 21 and an internal cylindrical bearing sleeve 24. Isolator 22 resiliently deflects to absorb vibratory energy. Sleeve 24 pivotally secures damper 10 at a desired point on the vehicle.

Reservoir tube 16 extends upwardly from base cup 18 as a cylindrical main body 16A extending approximately about two-thirds of its overall length. The upper third of the reservoir tube 16 includes a pair of reduced diameter portions 30 and 32. Intermediate portion 30 carries a cylindrical metallic rebound stop 34 secured to its inner wall. Upper step 32 carries a cylindrical metallic rod guide 36 secured to its inner wall. Rebound stop 34 and rod guide 36 have aligned, centralized, cylindrical openings 38 and 40, respectively, to accommodate a cylindrical piston rod 42. A cylindrical antifriction bearing 43 is press-fitted into the inner wall of rod guide opening 40. Preferably, bearing 43 is constructed from sintered bronze and Teflon (polytetrafluoroethylene), and forms a low-friction bearing for the piston rod 42.

Secured to the lower end of piston rod 42 is a valved piston assembly 50 which includes a generally cylindrical shell 52 dimensioned to slidably fit within the reservoir tube 16. Shell 52 carries an overlapping band-type annular seal 56 of graphite-filled Teflon or other suitable antifriction material. A valve assembly (not illustrated) is carried internally in the shell 52 to permit the transfer of fluid between the upper and lower portions of the reservoir tube 16. A particular type of valve assembly suitable for piston assembly 50 is described in applicant's pending U.S. patent application, Ser. No. 181,478, filed Apr. 14, 1988, titled "Air Spring Damper For Vehicle Suspension" and assigned to the same assignee as the assignee of this application. The valve assembly described in U.S. Ser. No. 181,478 is hereby incorporated by reference.

It is desirable to include a resilient compression or jounce bumper 60 mounted in the interior base of the cylindrical tube 16. Furthermore, a resilient rebound bumper 64 can be fitted around the piston rod 42 above the piston shell 52.

Air spring 12 is formed from a resilient air sleeve 70. Preferably, air sleeve 70 is formed from a radially elastomeric resilient material having an inner or high-pressure surface 72, a corded fabric 74 and an outer or low-pressure surface 76. A liner 80 formed from a radially elastomeric resilient material is placed adjacent the high-pressure surface 72 of air sleeve 70.

The lower ends of air sleeve 70 and liner 80 are secured about the upper portion of reservoir 16 by a clamp or band 82. A rolling lobe 84 is provided in the air sleeve 70 below its lower ends. Lobe 84 is a rolling element which travels down and up a profiled contact piston 90 during compression and rebound of the air spring 12. Piston 90 is a generally cylindrical member having an increased diameter portion 91 at its lower end. Piston 90 is slip fitted over the stepped upper portions 30 and 32 of the reservoir tube 16 for support of the air spring 12. The upper end of piston 90 covers clamp 82 so that clamp 82 cannot contact and wear the outer surface 76 of air sleeve 70. Preferably, piston 90 is formed from a rigid plastic material and provides an optimized surface to accommodate the rolling action of the lobe 84 with reduced friction.

A rolling lobe 86 is provided in the portion of liner 80 below its clamped lower end. As lobe 84 travels on contact piston 90, lobe 86 follows a complementary course along the inner surface 72 of air sleeve 70. It is desirable to provide conventional lubrication on the outer surface of liner 80 and the inner surface 72 of air sleeve 70 to reduce friction and wear. If desired, the upper and lower ends of liner 80 can be bonded to the sleeve inner surface 72 to aid in the assembly of air sleeve 70.

The upper end of the air spring 12 is secured to a top mount in an airtight fashion in any suitable manner. A particular assembly for securing the upper ends of air sleeve 70 and liner 80 includes a circular band or clamp 92 for retaining sleeve 70 to a mounting plate 94. If desired, an air fitting 96 can be mounted by an elastomeric isolator body 98 in mounting plate 94. A suitable assembly for sealing the upper portions of air sleeve 70 and liner 80 having a clamp 92, mounting plate 94, air fitting 96 and isolator body 98 are described in applicants' pending patent application, U.S. Ser. No. 181,478 filed Apr. 14, 1988, which is hereby incorporated by reference.

It will be understood that the air spring 12 of the present invention can be incorporated with various dampers for automobiles. In particular, air spring 12 having air sleeve 70 and liner 80 can be adapted and utilized with a MacPherson strut.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A suspension device for a vehicle, comprising:
   (a) a damper having relatively movable telescopic parts including
      (i) a rigid tubular member,
      (ii) a piston assembly mounted inside the tubular member for stroking movement, and
      (iii) a piston rod connected to the piston assembly and extending through one end of the tubular member;
   (b) a corded, resilient sleeve member having first and second ends, and inner and outer surfaces;
   (c) a resilient liner, formed separately from the sleeve member and having first and second ends, the liner positioned adjacent to and completely covering the inner surface of the sleeve member;
   (d) first fastener means for securing the respective first ends of the sleeve member and the liner in an airtight manner with respect to the tubular member; and
   (e) second fastener means for securing the respective second ends of the sleeve member and liner in an airtight manner with respect to the piston rod so that the liner forms a closed chamber for receiving and containing a pressurized fluid, wherein the chamber surrounds a portion of the damper to provide an air spring capable of yieldably resisting telescopic movement of the damper.

2. The suspension device as specified in claim 1 including lubrication means provided between the sleeve member inner surface and the liner.

3. The suspension device for a vehicle as specified in claim 1 wherein:
   (a) the sleeve member includes a rolling lobe provided between the first and second ends of the sleeve member, the lobe being movable on reciprocal movement of the piston and piston rod with respect to the tubular member; and
   (b) the liner includes a rolling lobe provided between the first and second ends of the liner, the lobe being movable and following a path complementary to the rolling lobe of the sleeve member.

4. An air spring for use with a damper having a tubular member, a piston assembly and a piston rod, the air spring comprising:
   (a) a tubular sleeve having first and second end portions and inner and outer surfaces, the sleeve constructed from a radially elastomeric, corded material;
   (b) a tubular liner, formed separately from the sleeve and having first and second ends secured adjacent the inner surface of the respective ends of the sleeve, the liner constructed from a radially elastomeric material having a diameter less than the diameter of the sleeve and completely covering the inner surface of the sleeve to form a closed chamber for receiving a pressurized fluid;
   (c) first fastener means for connecting and sealing the respective first ends of the sleeve and the liner to the damper tubular member;
   (d) second fastener means for connecting and sealing the respective second ends of the sleeve and the liner to the piston rod;
   (e) a first rolling lobe provided in the sleeve between the first and second ends which travels as the air spring compresses and rebounds during use; and
   (f) a second rolling lobe provided in the liner between the first and second ends which follows a path complementary to the rolling lobe of the sleeve.

5. The air spring as specified in claim 4 including lubrication means provided between the sleeve inner surface and the liner outer surface.

* * * * *